United States Patent
Yamamoto

(10) Patent No.: US 12,505,853 B2
(45) Date of Patent: Dec. 23, 2025

(54) SIGNAL PROCESSING DEVICE AND METHOD

(71) Applicant: SONY GROUP CORPORATION, Tokyo (JP)

(72) Inventor: Yuki Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 314 days.

(21) Appl. No.: 18/005,801

(22) PCT Filed: Jul. 21, 2021

(86) PCT No.: PCT/JP2021/027256
§ 371 (c)(1),
(2) Date: Jan. 17, 2023

(87) PCT Pub. No.: WO2022/030259
PCT Pub. Date: Feb. 10, 2022

(65) Prior Publication Data
US 2023/0282226 A1 Sep. 7, 2023

(30) Foreign Application Priority Data
Aug. 4, 2020 (JP) ................................ 2020-132315

(51) Int. Cl.
*G10L 25/60* (2013.01)
*G06F 3/04847* (2022.01)
(Continued)

(52) U.S. Cl.
CPC .......... *G10L 25/60* (2013.01); *G06F 3/04847* (2013.01); *G10L 21/0364* (2013.01); *G10L 25/30* (2013.01); *G10L 25/84* (2013.01)

(58) Field of Classification Search
CPC ..... G10L 25/60; G10L 21/0364; G10L 25/30; G10L 25/84; G10L 17/04; G10L 17/18;
(Continued)

(56) References Cited

U.S. PATENT DOCUMENTS

| | | | |
|---|---|---|---|
| 7,500,190 B1 * | 3/2009 | Bhatt | G11B 27/34 345/646 |
| 9,065,409 B2 * | 6/2015 | Sandgren | H03G 9/025 |

(Continued)

FOREIGN PATENT DOCUMENTS

| | | | | |
|---|---|---|---|---|
| WO | 2019/027053 A1 | 2/2019 | | |
| WO | WO-2022250772 A1 * | 12/2022 | ........... | H04N 21/854 |

OTHER PUBLICATIONS

International Search Report and Written Opinion of PCT Application No. PCT/JP2021/027256, issued on Oct. 19, 2021, 10 pages of ISRWO.

(Continued)

*Primary Examiner* — Richemond Dorvil
(74) *Attorney, Agent, or Firm* — CHIP LAW GROUP

(57) ABSTRACT

Provided is a signal processing device that includes a voice detection unit that, based on a mixed audio signal containing a sound of a target sound source and a sound of a non-target sound source different from the target sound source, detects a time segment of the sound of the target sound source from the mixed audio signal; and a voice determination unit that, based on label information indicating the time segment of the sound of the target sound source in an audio signal of the target sound source and a detection result for the time segment of the sound of the target sound source, performs determination processing for determining whether the sound of the target sound source in the mixed audio signal is easy to hear.

17 Claims, 9 Drawing Sheets

(51) Int. Cl.
*G10L 21/0364* (2013.01)
*G10L 25/30* (2013.01)
*G10L 25/84* (2013.01)

(58) Field of Classification Search
CPC ... G10L 17/20; G10L 21/0272; G10L 21/028; G10L 21/02; G10L 30/34
See application file for complete search history.

(56) References Cited

U.S. PATENT DOCUMENTS

| | | | | |
|---|---|---|---|---|
| 9,418,676 | B2* | 8/2016 | Takahashi | G10L 21/0208 |
| 10,424,294 | B1* | 9/2019 | Lema | G10L 15/02 |
| 2009/0175459 | A1* | 7/2009 | Marumoto | H03G 3/32 |
| | | | | 704/258 |
| 2011/0224976 | A1* | 9/2011 | Taal | G10L 25/69 |
| | | | | 704/E21.002 |
| 2011/0246185 | A1* | 10/2011 | Arakawa | G10L 25/78 |
| | | | | 704/200 |
| 2014/0035920 | A1* | 2/2014 | Duwenhorst | G06T 11/001 |
| | | | | 345/440 |
| 2014/0149117 | A1* | 5/2014 | Bakish | G10L 15/24 |
| | | | | 704/248 |
| 2015/0281853 | A1* | 10/2015 | Eisner | H04R 25/505 |
| | | | | 381/312 |
| 2021/0375306 | A1* | 12/2021 | Li | G06N 20/10 |

OTHER PUBLICATIONS

Kobayashi, et al., "Japanese speech intelligibility estimation and prediction using objective intelligibility indices under noisy and reverberant conditions", Applied Acoustics, vol. 156, Dec. 15, 2019, 27 pages.

Kevin P. Murphy, "Machine Learning A Probabilistic Perspective", The MIT Press, Aug. 24, 2012, 1098 pages.

Goodfellow, et al., "Deep Learning", The MIT Press, Nov. 18, 2016, 800 pages.

* cited by examiner

SIGNAL PROCESSING DEVICE AND METHOD

CROSS REFERENCE TO RELATED APPLICATIONS

This application is a U.S. National Phase of International Patent Application No. PCT/JP2021/027256 filed on Jul. 21, 2021, which claims priority benefit of Japanese Patent Application No. JP 2020-132315 filed in the Japan Patent Office on Aug. 4, 2020. Each of the above-referenced applications is hereby incorporated herein by reference in its entirety.

TECHNICAL FIELD

The present technique relates to a signal processing device, a signal processing method, and a program, and more particularly to a signal processing device, a signal processing method, and a program which are capable of reducing the production cost of content.

BACKGROUND ART

The types of sound sources included in video content such as movies and dramatic series can be broadly classified into voice, background sound, sound effects, and music.

For example, identification processing such as speaker identification, ambient sound identification, and the like are known as techniques related to the type of a sound source, and methods using linear identification, decision trees, support vector machines, neural networks, and the like have been proposed as such identification processing (see, for example, NPL 1 and NPL 2).

CITATION LIST

Non Patent Literature

[NPL 1]
Kevin P. Murphy, Machine Learning: A Probabilistic Perspective, The MIT Press, 2012
[NPL 2]
Ian Goodfellow, Yoshua Bengio, and Aaron Courville, Deep Learning, The MIT Press, 2016

SUMMARY

Technical Problem

Incidentally, voice is often the most important sound source among the sound sources contained in video content such as movies and dramatic series. This is because voice plays an essential role in conveying the story and details of the content, such as dialogue and narration.

Accordingly, the producers of sound for such content have performed the following two editing tasks E1 and E2 in the process of mixing multiple sound sources, i.e., mixing work, to ensure that voice is audible.
(Editing Task E1)
Confirmation as to whether the voice is easy to hear
(Editing Task E2)
Editing task to make the voice easier to hear when the voice is difficult to hear
The following editing tasks E2(1) to E2(3) are conceivable as specific examples of the editing task E2.
(Editing Task E2(1))
Raising the volume of the voice or lowering the volume of sound sources aside from voice
(Editing Task E2(2))
Changing the equalization (EQ) of the voice or changing the EQ of sound sources aside from voice
(Editing Task E2(3))
Replacing sound sources aside from voice with other sound sources However, these editing tasks are currently performed manually, which increases the content production cost.

Having been conceived in light of such circumstances, the present technique makes it possible to reduce the production cost of content.

Solution to Problem

A signal processing device according to one aspect of the present technique includes: a voice detection unit that, based on a mixed audio signal containing a sound of a target sound source and a sound of a non-target sound source different from the target sound source, detects a time segment of the sound of the target sound source from the mixed audio signal; and a voice determination unit that, based on (i) label information indicating the time segment of the sound of the target sound source in an audio signal of the target sound source and (ii) a detection result for the time segment of the sound of the target sound source, performs determination processing for determining whether the sound of the target sound source in the mixed audio signal is easy to hear.

A signal processing method or program according to one aspect of the present technique includes the steps of: detecting, based on a mixed audio signal containing a sound of a target sound source and a sound of a non-target sound source different from the target sound source, a time segment of the sound of the target sound source from the mixed audio signal; and based on (i) label information indicating the time segment of the sound of the target sound source in an audio signal of the target sound source and (ii) a detection result for the time segment of the sound of the target sound source, performing determination processing for determining whether the sound of the target sound source in the mixed audio signal is easy to hear.

In one aspect of the present technique, the following are performed: detecting, based on a mixed audio signal containing a sound of a target sound source and a sound of a non-target sound source different from the target sound source, a time segment of the sound of the target sound source from the mixed audio signal; and based on (i) label information indicating the time segment of the sound of the target sound source in an audio signal of the target sound source and (ii) a detection result for the time segment of the sound of the target sound source, performing determination processing for determining whether the sound of the target sound source in the mixed audio signal is easy to hear.

DESCRIPTION OF EMBODIMENTS

Hereinafter, embodiments to which the present technique is applied will be described with reference to the drawings.

First Embodiment

Present Technique

The present technique makes it possible to reduce the production cost of content by automating the above-described editing task E1, editing task E2, and the like.

Generally, most of the mixing work for sound sources for video content such as movies and dramatic series is performed using software called a Digital Audio Workstation (DAW).

Figure 1:
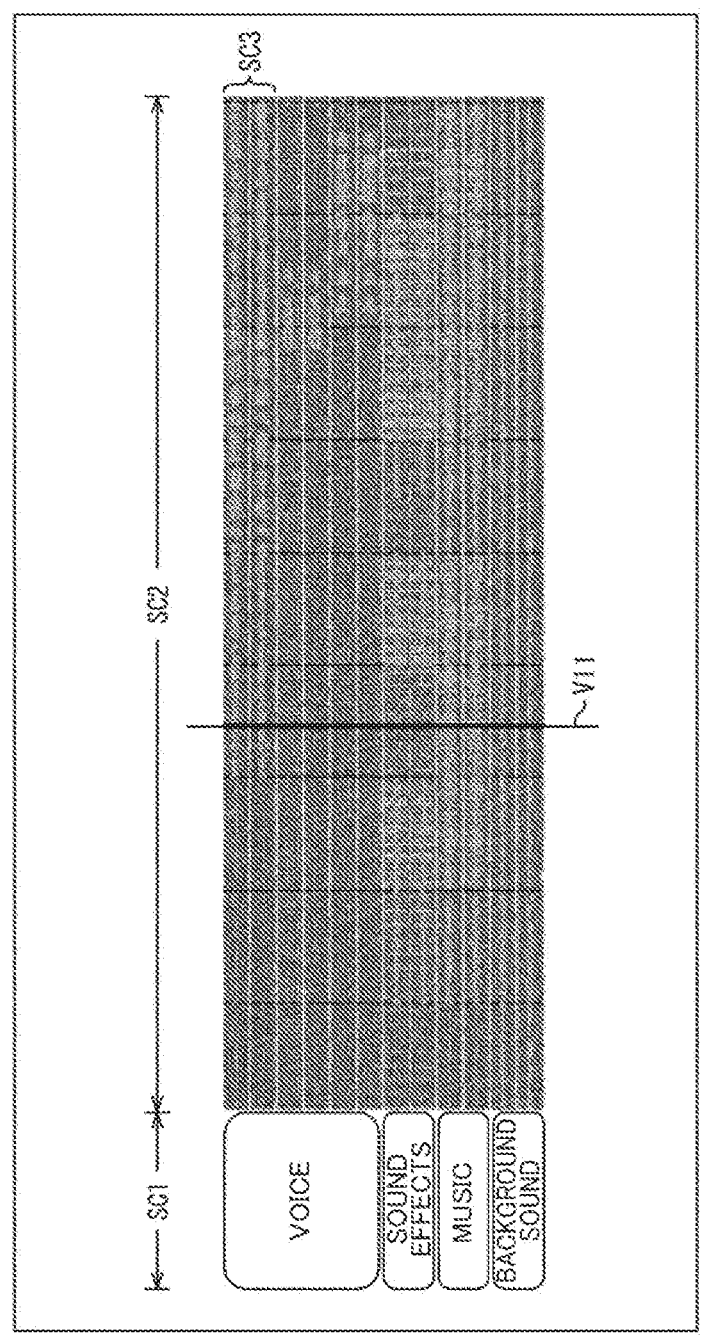
FIG. 1 is a diagram illustrating an example of an editing screen of a DAW.

For example, in a DAW, an editing screen such as that illustrated in FIG. 1 is displayed, and each of a plurality of sound sources constituting the content is edited.

In this example, time waveforms of the audio signals of each of the plurality of sound sources are displayed on top of each other, such that the user (content producer) performing the editing task can play back the audio signals of these sound sources simultaneously.

The part of a region SC1 in the editing screen shows the sound source type of each audio signal constituting the content, indicating that the content is constituted by four sound source types, namely "voice", "sound effect", "music", and "background sound".

The time waveform of each audio signal is displayed in the part of a region SC2, and in the region SC2, the horizontal direction in the figure indicates the time direction.

For example, in the part of a region SC3 within region SC2, the time waveform of the audio signal of one sound source having a sound source type of "voice", i.e., one track's worth of an audio signal, is displayed.

In this example, the audio signal of one sound source is a stereo signal having two channels on the left and right (L and R), but the audio signal of each sound source may be a monaural signal with one channel or a multi-channel signal of three or more channels.

A playback bar V11, which indicates a playback position when the content, i.e., sound based on the audio signals of all sound sources, is played back, is displayed within the region SC2 of the editing screen, and as the user plays back the content, playback bar V11 moves to the right in the figure as time passes.

The user can play the content from any desired playback position by moving the playback bar V11 to the desired position.

Generally, content producers who are users of DAWs simultaneously play back the sound based on the audio signals of all sound sources constituting the content, and create the content by performing the above-described editing task E1, editing task E2, and the like while listening to the sound being played back, i.e., the sound of the content.

In the present technique, the editing task E1, the editing task E2, and the like are performed automatically, i.e., in a signal processing device that implements the DAW.

Automation techniques for the editing task E1, the editing task E2, and the like will be described hereinafter.

Although any type of sound source can be used for the audio signal that constitutes the content, the following will describe an example using four types of sound sources for the audio signals that constitute the content, namely "voice", "sound effect", "music", and "background sound".

A1: Automating the Confirmation as to Whether the Voice is Easy to Hear

Automating the editing task E1, i.e., the confirmation as to whether the voice is easy to hear in the content, will be described first. In the present technique, a detector is used to detect the voice, and the confirmation as to whether the voice is easy to hear is performed in the signal processing device.

A1-1: Detector Training

In the present technique, the detector used to confirm whether the voice is easy to hear is generated in advance through machine learning using, for example, a neural network.

In the machine learning for the detector, for example, the audio signal of each sound source from past content is used as training data.

As mentioned earlier, much of the past content has been edited and generated by DAWs, and thus the audio signal for each sound source in much of such past content can be used.

First, a voice audio added signal, in which an audio signal having a sound source type of "voice", and a non-voice audio added signal, in which an audio signal having a sound source type aside from "voice", are generated for a given piece of past content.

An overall segment of sound based on the voice audio added signal is constituted by a time segment in which voice is present, i.e., with sound (also called a "sound segment" hereinafter), and a time segment in which voice is not present, i.e., silence (also called a "silent segment" hereinafter). In other words, the voice audio added signal is constituted by a signal of a sound segment and a signal of a silent segment.

During machine learning, a voice ground truth label, which is label information indicating whether a segment is a sound segment having sound of the sound source type "voice", is added to each time segment, such as each frame of the voice audio added signal.

Specifically, a voice ground truth label having a value of "1", i.e., a voice ground truth label value of "1", which indicates that a segment is a sound segment, is added to the sound segment in the voice audio added signal.

On the other hand, a voice ground truth label having a value of "0", i.e., a voice ground truth label value of "0", which indicates that a segment is not a sound segment, is added to the silent segment in the voice audio added signal.

The adding of such voice ground truth labels may be performed automatically based on threshold determination processing for sound pressure values in the voice audio added signal, detection techniques using neural networks, or the like, or may be performed manually by a user or the like.

For example, when voice ground truth labels are added by a discriminator using a neural network, the discriminator may be trained such that the processing boundaries of computation processing performed by the discriminator on a predetermined frame of an input voice audio added signal coincide with the processing boundaries of computation processing performed by the discriminator on another frame of the input voice audio added signal. This makes it possible to reduce the amount of memory required during the computation processing by the discriminator.

Additionally, for example, when the voice ground truth labels are added through threshold determination processing, a voice ground truth label value of "1" may be added when the sound pressure value of the voice audio added signal is greater than or equal to a predetermined threshold.

Next, the voice audio added signal and the non-voice audio added signal are added and the result is taken as an audio added signal.

Data sets including such audio added signals and the voice ground truth label values added for each time segment are generated for a large amount of past content, and those data sets are prepared as the training data.

Then, a voice detector is generated by performing machine learning which takes the audio added signals of the training data sets as an input and the voice ground truth labels as an output is performed using a neural network or the like.

In this case too, the detector may be trained such that the processing boundaries of computation processing performed by the detector on a predetermined frame of the input audio added signal coincide with the processing boundaries of the computation processing performed by the detector on other frames.

The detector such as the neural network generated through the machine learning as described above in particular will also be called a "voice detector" hereinafter.

When a predetermined audio signal is input, the voice detector performs computation processing based on the audio signal and parameters constituting the neural network or the like, detects whether sound having a sound source type of "voice" is included in the sound based on the audio signal, and outputs a voice ground truth label as a result of the detection. In other words, a time segment of sound having a sound source type of "voice" is detected.

The voice ground truth label which is the output of the voice detector is a numerical value between "0" and "1", and as the voice ground truth label value approaches "1", there is a higher likelihood that the input audio signal contains sound having a sound source type of "voice".

At the same time, it can be said that the voice ground truth label value indicates how easy it is to hear the sound of the sound source type "voice" contained in the input audio signal when sound is played back based on that audio signal.

In other words, the data set for training the voice detector is constituted by (i) audio added signals resulting from editing tasks in which the producer made sound having a sound source type of "voice" easier to hear when creating past content and (ii) voice ground truth labels indicating in which time segments of those audio added signals the sound of the sound source type "voice" is present.

As such, the voice detector that is the result of training performed based on such a data set for training outputs a voice ground truth label having a value closer to "1" as the sound based on the input audio signal approaches the same ease of hearing as the voice in the past content (sound having a sound source type of "voice"). Conversely, the voice detector outputs a voice ground truth label having a value closer to "0" as the sound based on the input audio signal moves away from the same ease of hearing as the voice in the past content. In other words, the closer the voice ground truth label value is to "1", the easier it is to hear sound having a sound source type of "voice" when the sound based on the input audio signal is played back.

In the following, the voice ground truth label, which is the output of the voice detector, will also be specifically referred to as a "voice detection label". The value of the voice detection label indicates how easy it is to hear sound having a sound source type of "voice" when content is played back.

A1-2: Application of Detector

The application of the voice detector described above will be described next.

A sound source having a sound source type of "voice" in new content is given a voice ground truth label value of "1" for time segments of voice, and is given a voice ground truth label value of "0" for time segments aside from voice. The "new content" mentioned here is, for example, content to be edited.

Similar to the machine learning for the voice detector described above, the adding of voice ground truth labels in this case may be performed automatically based on threshold determination processing for sound pressure values in the audio signal, detection techniques using neural networks, or the like, or may be performed manually by a user or the like. Additionally, when adding the voice ground truth labels with a discriminator that uses a neural network, the discriminator may be trained such that the processing boundaries of the computation processing coincide for mutually-different frames, as mentioned above.

Next, an audio signal obtained by mixing the audio signals of all the sound sources constituting the new content, i.e., the above-described audio added signal, is input to the voice detector, and a voice detection label, which is the output of the voice detector, is obtained.

The following Formula (1) is then calculated based on the voice detection label, and a difference $label_{\mathit{diff}}(\mathrm{ifrm})$ is obtained for each time segment ifrm.

[Math. 1]

$$label_{\mathit{diff}}(\mathrm{ifrm})=label_{\mathit{ref}}(\mathrm{ifrm})-label_{\mathit{detect}}(\mathrm{ifrm}) \qquad (1)$$

Note that in Formula (1), "ifrm" indicates a predetermined time segment such as a frame or the like. $label_{\mathit{ref}}(\mathrm{ifrm})$ indicates the voice ground truth label for the time segment ifrm, added to the audio added signal of the content, or to be more specific, to the voice audio added signal, and the value of the voice ground truth label $label_{\mathit{ref}}(\mathrm{ifrm})$ is either "0" or "1". Additionally, in Formula (1), $label_{\mathit{detect}}(\mathrm{ifrm})$ indicates the voice detection label for the time segment ifrm, and the value of the voice detection label is a value between "0" and "1".

Accordingly, the difference $label_{\mathit{diff}}(\mathrm{ifrm})$ is the value of a difference between the value of the voice ground truth label $label_{\mathit{ref}}(\mathrm{ifrm})$ and the value of the voice detection label $label_{\mathit{detect}}(\mathrm{ifrm})$, obtained based on those values.

In Formula (1), the value of the difference $label_{\mathit{diff}}(\mathrm{ifrm})$ decreases as the value of the voice detection label $label_{\mathit{detect}}(\mathrm{ifrm})$ approaches "1", indicating that it is easier to hear sounds having a sound source type of "voice".

Once the difference $label_{\mathit{diff}}(\mathrm{ifrm})$ is obtained in this manner, threshold processing is performed based on that difference $label_{\mathit{diff}}(\mathrm{ifrm})$ and a predetermined threshold thre, and a sound having a sound source type of "voice", i.e., voice, is determined to be difficult to hear in a time segment ifrm in which the difference $label_{\mathit{diff}}(\mathrm{ifrm})$ is greater than the threshold thre.

The threshold thre is set to 0.5 or the like, for example. Note that when the value of the difference label$_{diff}$(ifrm) is less than or equal to 0, that time segment does not contain any voice, and thus the above-described editing task E2 is not necessary.

In contrast, in a time segment ifrm where the difference label$_{diff}$(ifrm) is greater than the threshold thre, it is difficult to hear voice, and thus the above-described editing task E2 is necessary.

As described above, using a voice detector generated using past content as training data makes it possible to reduce the production cost of content by automating the process of confirming whether voice is easy to hear, which had previously been performed manually.

A2: Automating Editing Task for Making Voice Easier to Hear

The automation of the editing task E2, for making voice easier to hear, will be described next.

The above-described editing task E2 may be performed on the time segment ifrm in which voice is determined to be difficult to hear through the determination processing performed based on the difference label$_{diff}$(ifrm), such that the difference label$_{diff}$(ifrm) drops below the threshold thre.

The above-described editing tasks E2(1) to E2(3) are conceivable as specific examples of the editing task E2.

Editing Task E2(1)

Raising the volume of the voice or lowering the volume of sound sources aside from voice Editing Task E2(2)

Changing the EQ of the voice or changing the EQ of sound sources aside from voice Editing Task E2(3)

Replacing sound sources aside from voice with other sound sources

Automating these editing tasks makes it possible to automate the editing task E2 for making the voice easier to hear.

For example, in the processing for the automated editing task E2(1), gain adjustment is performed on the audio signal having a sound source type of "voice", and the audio added signal is generated using the gain-adjusted audio signal. Then, the difference label$_{diff}$(ifrm) is obtained based on the audio added signal obtained, and the above-described determination processing is performed.

At this time, when the difference label$_{diff}$(ifrm) drops below the threshold thre, the processing of the editing task E2 is assumed to have ended, whereas when the difference label$_{diff}$(ifrm) is greater than the threshold thre, the gain adjustment is repeated for the audio signal having a sound source type of "voice" until the difference label$_{diff}$(ifrm) drops below the threshold thre.

For example, one degree of gain adjustment is made to increase the volume of the audio signal having a sound source type of "voice" by 0.1 dB. The gain adjustment is performed within a predetermined adjustment range (also called a "volume adjustment range" hereinafter), e.g., −6 dB to 6 dB of volume adjustment.

Note that the volume adjustment range may be a range over which the volume can be increased or decreased, i.e., a range which the adjustment amount can take, or may be a range which the volume of sound based on the audio signal after volume adjustment (gain adjustment) can take.

In the processing of the automated editing task E2(1), gain adjustment is also performed on audio signals having a sound source type aside from "voice", for example.

In this case too, gain adjustment which reduces the volume by 0.1 dB is repeated for the audio signal having a sound source type aside from "voice" until the difference label$_{diff}$(ifrm) drops below the threshold thre, for example. Note that the gain adjustment for the audio signal having a sound source type aside from "voice" is also performed until the volume adjustment falls within a volume adjustment range of −6 dB to 6 dB, for example.

In the processing of the editing task E2(1), whether to perform the gain adjustment on the audio signal having a sound source type of "voice" or perform gain adjustment on the audio signal having a sound source type aside from "voice" may be set in advance, or may be selected dynamically.

For example, if gain adjustment has been performed on the audio signal having a sound source type of "voice" but the difference label$_{diff}$(ifrm) does not drop below the threshold thre through adjustment within the volume adjustment range, the gain adjustment can further be performed on the audio signal having a sound source type aside from "voice". The gain adjustment on the audio signal having a sound source type of "voice" and the gain adjustment on the audio signal having a sound source type aside from "voice" may also be performed simultaneously.

In the processing of the automated editing task E2(2), for example, equalizer processing is performed to increase the level of a predetermined EQ band (frequency band) in the audio signal having a sound source type of "voice" by 0.1 dB. At this time, for example, the level of the predetermined EQ band may be increased while simultaneously reducing the levels of other EQ bands different from the predetermined EQ band.

Here, the EQ band to be processed in the equalizer processing, i.e., the EQ band for which the level is to be increased (the volume is to be increased), is, for example, the EQ band that contains many components in a typical audio signal of voice.

In this case, the equalizer processing is repeatedly performed on the audio signal having a sound source type of "voice" within the range of a predetermined level (volume), e.g., the above-described volume adjustment range, until the difference label$_{diff}$(ifrm) drops below the threshold thre. Note that the level (volume) range that can be adjusted may be determined for the entire audio signal (the entire frequency band), or may be determined for each EQ band. Furthermore, the level (volume) range that can be adjusted may differ between the processing of the editing task E2(1) and the processing of the editing task E2(2).

Additionally, in the processing of the automated editing task E2(2), for example, equalizer processing is performed to reduce the level of a predetermined EQ band in the audio signal having a sound source type aside from "voice" by 0.1 dB.

In this case as well, the equalizer processing is repeatedly performed on the audio signal having a sound source type aside from "voice" within, for example, the above-described volume adjustment range, until the difference label$_{diff}$(ifrm) drops below the threshold thre.

Note that in the processing of the editing task E2(2), whether to perform the equalizer processing on the audio signal having a sound source type of "voice" or perform the equalizer processing on the audio signal having a sound source type aside from "voice" may be set in advance, or may be selected dynamically.

For example, if equalizer processing has been performed on the audio signal having a sound source type of "voice" but the difference label$_{diff}$(ifrm) does not drop below the threshold thre within the volume adjustment range, the equalizer processing can further be performed on the audio signal having a sound source type aside from "voice".

Furthermore, the equalizer processing may be performed on the audio signal having a sound source type of "voice" and the audio signal having a sound source type aside from "voice" at the same time.

In the processing of the automated editing task E2(3), for example, replacement processing is performed to replace an audio signal having a sound source type aside from "voice" with another audio signal having the same sound source type as the sound source type of that audio signal, i.e., having the same sound source characteristic information (the same attributes).

Specifically, for example, processing for replacing an audio signal of a predetermined sound effect with an audio signal of another sound effect similar to the predetermined sound effect is performed as the replacement processing.

Once the replacement is performed, the audio added signal is generated using the post-replacement audio signal. Then, the difference label$_{diff}$(ifrm) is obtained based on the audio added signal obtained, the above-describe determination processing is performed, and the replacement processing is repeated until the difference label$_{diff}$(ifrm) drops below the threshold thre.

By automatically performing at least one of the above-described editing task E2(1) to editing task E2(3), editing tasks for making voice easier to hear, which have previously been performed manually, can be automated, which makes it possible to reduce production costs.

In the processing of the automated editing task E2, any of the processing of the editing task E2(1) to the editing task E2(3) may be performed alone, or two or three instances of the processing may be performed in combination with each other.

For example, as the processing of the editing task E2, the editing task E2(1) may be performed first, and then the processing of the editing task E2(2) and the editing task E2(3) may be further performed if the difference label$_{diff}$(ifrm) does not drop below the threshold thre within the volume adjustment range in the processing of the editing task E2(1).

In this case, for example, the processing of the editing task E2(2) may be performed after the processing of the editing task E2(1), and then the processing of the editing task E2(3) may be further performed if the difference label$_{diff}$(ifrm) does not drop below the threshold thre in the editing task E2(2).

At this time, the processing of the editing task E2(2) may be performed on the audio signal obtained as a result of the processing of the editing task E2(1), and the processing of the editing task E2(3) may further be performed on the audio signal obtained as a result of the processing of the editing task E2(2). Doing so makes it possible to make the voice easier to hear while keeping the sound quality as close as possible to the intention of the content producer.

Note that when, for example, the processing of the editing task E2(2) is performed after the processing of the editing task E2(1), the processing of the editing task E2(2) may be performed before the processing of the editing task E2(1), i.e., on the original audio signal.

Editing Screen

An example of an editing screen (a Graphical User Interface (GUI)) of a DAW to which the present technique as described above is applied will be described here with reference to FIGS. 2 to 6.

Note that in FIGS. 2 to 6, parts corresponding to those in FIG. 1 are denoted by the same reference signs, and descriptions thereof will be omitted as appropriate. Furthermore, in FIGS. 2 to 6, parts corresponding to each other are denoted by the same reference signs, and descriptions thereof will be omitted as appropriate.

Figure 2:
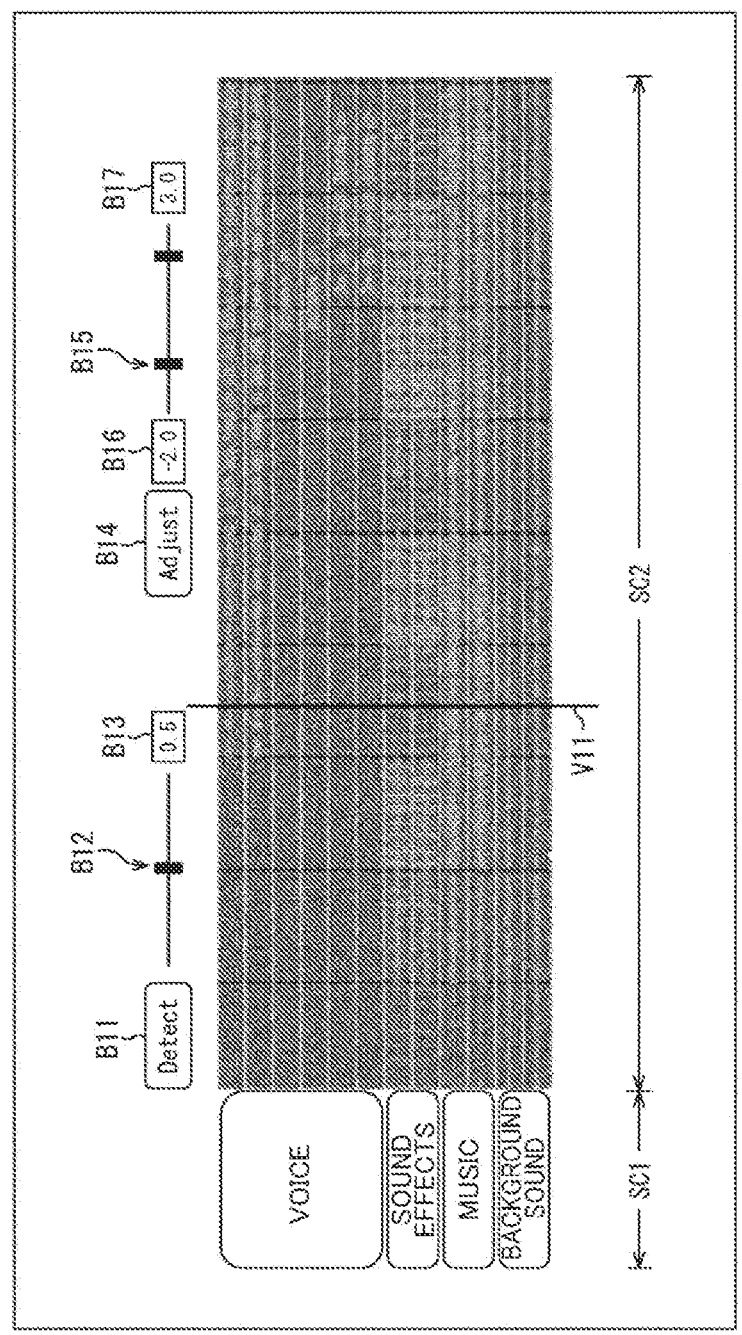
FIG. 2 is a diagram illustrating an example of an editing screen of a DAW to which the present technique is applied.

When the DAW to which the present technique is applied is run, the editing screen illustrated in FIG. 2, for example, is displayed.

The region SC1, in which the sound source type of each audio signal is displayed, and the region SC2, in which the time waveform of each audio signal is displayed, are provided in this editing screen, and the playback bar V11 is also displayed in the region SC2.

The editing screen also includes a GUI for instructing the determination processing as to whether voice is easy to hear, specifying the parameters (the threshold thre) to be used in the determination processing, and the like. More specifically, the editing screen includes a detect button B11, a detection threshold bar B12, and a detection threshold text box B13 as GUI components (widgets).

The editing screen also includes an adjust button B14, an adjustment threshold bar B15, an adjustment threshold lower limit text box B16, and an adjustment threshold upper limit text box B17 as a GUI (GUI components) for instructing the processing of the editing task for making voice easier to hear to be executed, specifying the parameters (the volume adjustment range) to be used in the processing of the editing task, and so on.

The user who is the content producer can operate the detect button B11 to the text box B17 to determine whether the voice is easy to hear, adjust the parameters, such as thresholds, in the processing for making the voice easier to hear, and the like.

The detection threshold bar B12 is a GUI for adjusting (specifying) the threshold thre used in the determination processing as to whether the voice is easy to hear.

For example, when the slider of the detection threshold bar B12 is set to the leftmost position in the drawings, the threshold thre is set to "0", and when the slider is set to the rightmost position in the drawings, the threshold thre is set to "1".

The threshold thre can also be set by the user entering a numerical value as the threshold thre in the detection threshold text box B13. In this example, "0.5" is entered in the text box B13, and thus the threshold thre=0.5.

By pressing (operating) the detect button B11 after operating the detection threshold bar B12, the text box B13, and so on as appropriate, the user can execute the determination processing as to whether the voice is easy to hear for the content being edited.

Figure 3:
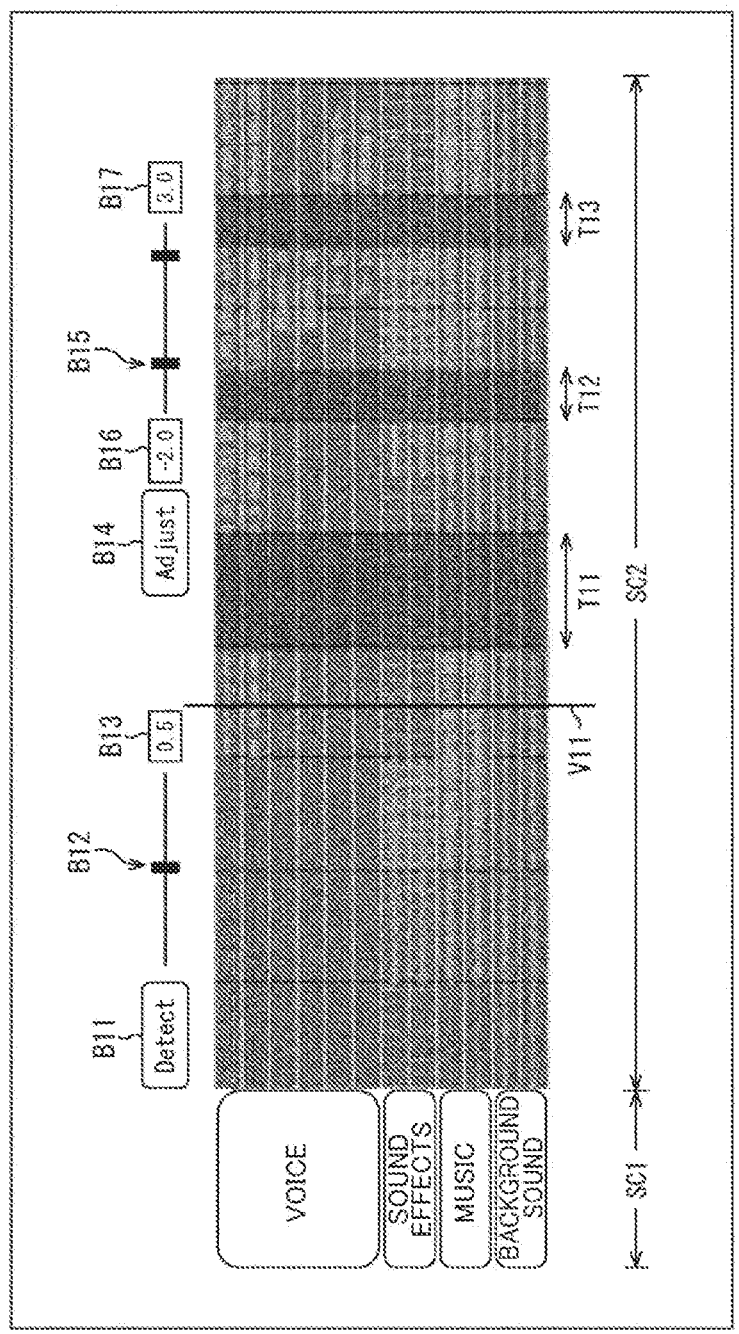
FIG. 3 is a diagram illustrating an example of an editing screen of the DAW to which the present technique is applied.

Once the detect button B11 is operated and the determination processing as to whether the voice is easy to hear is performed, the result of that determination is reflected to display the editing screen illustrated in FIG. 3, for example.

In the example in FIG. 3, parts of the region SC2 in the editing screen corresponding to time segments where the difference label$_{diff}$(ifrm) is higher than the threshold thre, i.e., the part from time segment T11 to time segment T13, are displayed in a different color from other time segments, such as red.

Time segment T11 to time segment T13 indicate time segments for which voice is determined to be difficult to hear as a result of the determination processing as to whether the voice is easy to hear.

The user can manually perform the processing of the above-described editing task E2 for time segment T11 to time segment T13, or can cause the processing to be performed automatically.

For example, if the user wishes to have the processing of the editing task E2 performed automatically, they can operate the adjust button B14, the adjustment threshold bar B15, the text box B16, and the text box B17 to cause the processing of the editing task E2 to be executed, specify parameters for gain adjustment and the like, and so on.

The adjustment threshold bar B15 is provided with two sliders, and by operating those sliders, the user can specify (change) the upper limit value and the lower limit value of the adjustment threshold, which corresponds to the volume adjustment range in the processing of the editing task E2(1) and the processing of the editing task E2(2).

Specifically, the user can specify the lower limit value of the adjustment threshold by operating the slider on the left side of the adjustment threshold bar B15 (called a "left slider" hereinafter), and for example, by setting the left slider to the leftmost position of the adjustment threshold bar B15 in the drawings, the lower limit value is set to −12 dB.

The user can also specify the lower limit value of the adjustment threshold by directly entering a desired numerical value in the adjustment threshold lower limit text box B16, and in this example, the lower limit value of the adjustment threshold is set to "−2.0 dB".

On the other hand, the user can specify the upper limit value of the adjustment threshold by operating the slider on the right side of the adjustment threshold bar B15 (called a "right slider" hereinafter), and for example, by setting the right slider to the rightmost position of the adjustment threshold bar B15 in the drawings, the upper limit value is set to 12 dB.

The user can also specify the upper limit value of the adjustment threshold by directly entering a desired numerical value in the adjustment threshold upper limit text box B17, and in this example, the upper limit value of the adjustment threshold is set to "3.0 dB".

After the user sets the upper limit value and the lower limit value of the adjustment threshold by operating the adjustment threshold bar B15, i.e., after setting the volume adjustment range, when the adjust button B14 is operated (pressed), the processing of the editing task E2(1), for example, is performed automatically, i.e., on the device side.

Figure 4:
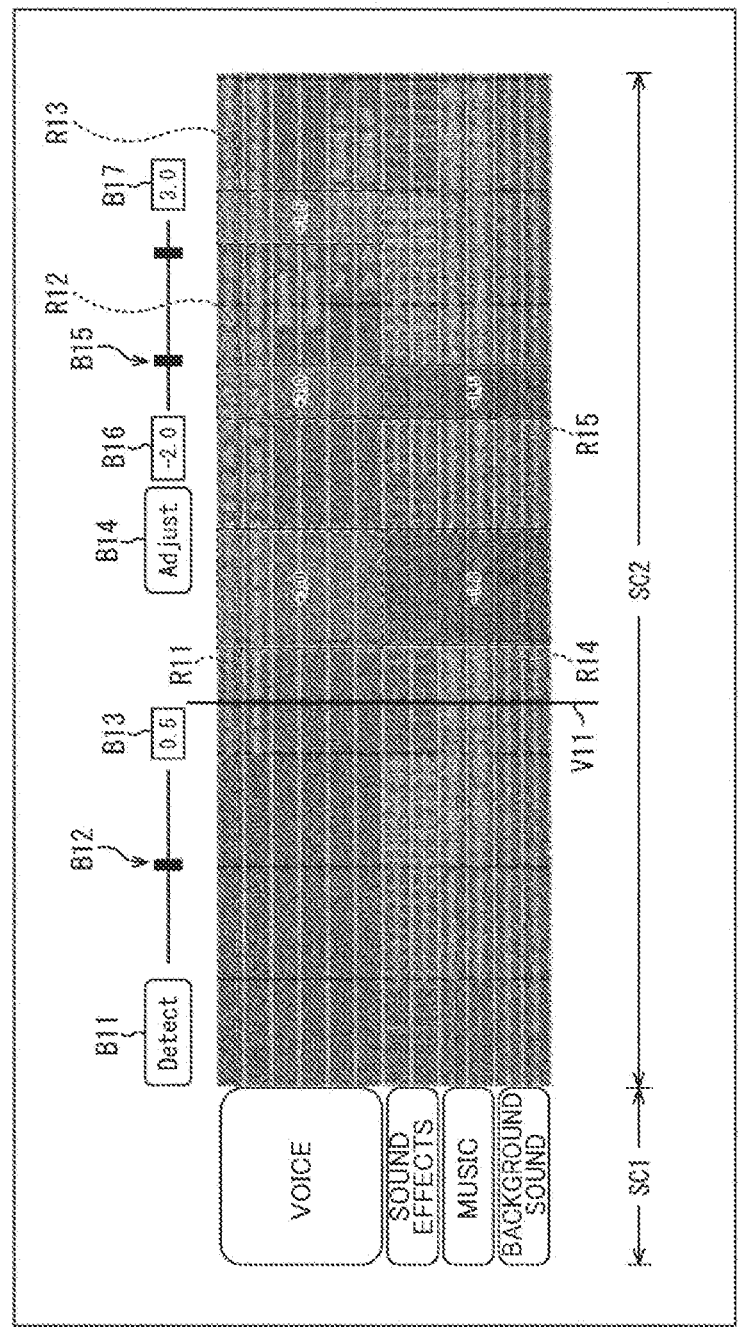
FIG. 4 is a diagram illustrating an example of an editing screen of the DAW to which the present technique is applied.

Through this, the result of the processing of the editing task E2(1) is reflected in the display in the editing screen, and the display in the editing screen is updated as indicated in FIG. 4, for example.

In this example, the region of the time segment for the track (the sound source) on which gain adjustment (volume adjustment) has been performed through the processing of the editing task E2(1) is displayed in a different color than in other regions.

Specifically, a region R11 to a region R13 in the part of the region SC2 for the sound source type of "voice" are displayed in a color different from the other regions, such as yellow.

Similarly, a region R14 and a region R15 in the part of the region SC2 having sound source types aside from a sound source type of "voice" are displayed in a color different from the other regions, such as purple.

The region R11 to the region R13, which are displayed in yellow, indicate time segments on which the volume adjustment of the editing task E2(1), i.e., gain adjustment, has been performed on the audio signals (the tracks) having a sound source type of "voice", and the amount of gain adjustment is displayed for those regions.

For example, a numerical value of "+3.0", indicating the amount of adjustment, is displayed in the region R11, which indicates that the volume has been raised by 3.0 dB through the gain adjustment in the time segment corresponding to the region R11. In particular, in this example, the gain adjustment is performed on the same time segments for the three tracks having the sound source type of "voice".

The region R14 and the region R15, which are displayed in purple, indicate time segments on which the gain adjustment of the editing task E2(1) has been performed on the audio signals (the tracks) having a sound source type aside from "voice", and the amount of gain adjustment is displayed for those regions.

Here, the tracks having a sound source type aside from "voice" are the tracks having sound source types of "sound effect", "music", and "background sound".

For example, a numerical value of "−1.8", indicating the amount of adjustment, is displayed in the region R14, which indicates that the volume has been lowered by 1.8 dB through the gain adjustment in the time segment corresponding to the region R14. In particular, in this example, the gain adjustment is performed on the same time segments for the three tracks having a sound source type aside from "voice".

Displaying the amount of gain adjustment within the region R11 to the region R15, which indicate time segments on which gain adjustment has been performed through the processing of the editing task E2(1), makes it possible for the user to instantly grasp how much gain adjustment has been performed in each time segment. This makes it possible to improve the usability of the DAW to which the present technique is applied, i.e., the content editing software.

If there is a time segment ifrm for which the difference label$_{diff}$(ifrm) is greater than the threshold thre even after the gain adjustment performed through the processing of the editing task E2(1), the processing of the editing task E2(2) is then performed automatically. In other words, equalizer processing for raising the level of a predetermined EQ band in the audio signal having a sound source type of "voice", equalizer processing for lowering the level of a predetermined EQ band in audio signals having a sound source type aside from "voice", and the like are performed.

Figure 5:
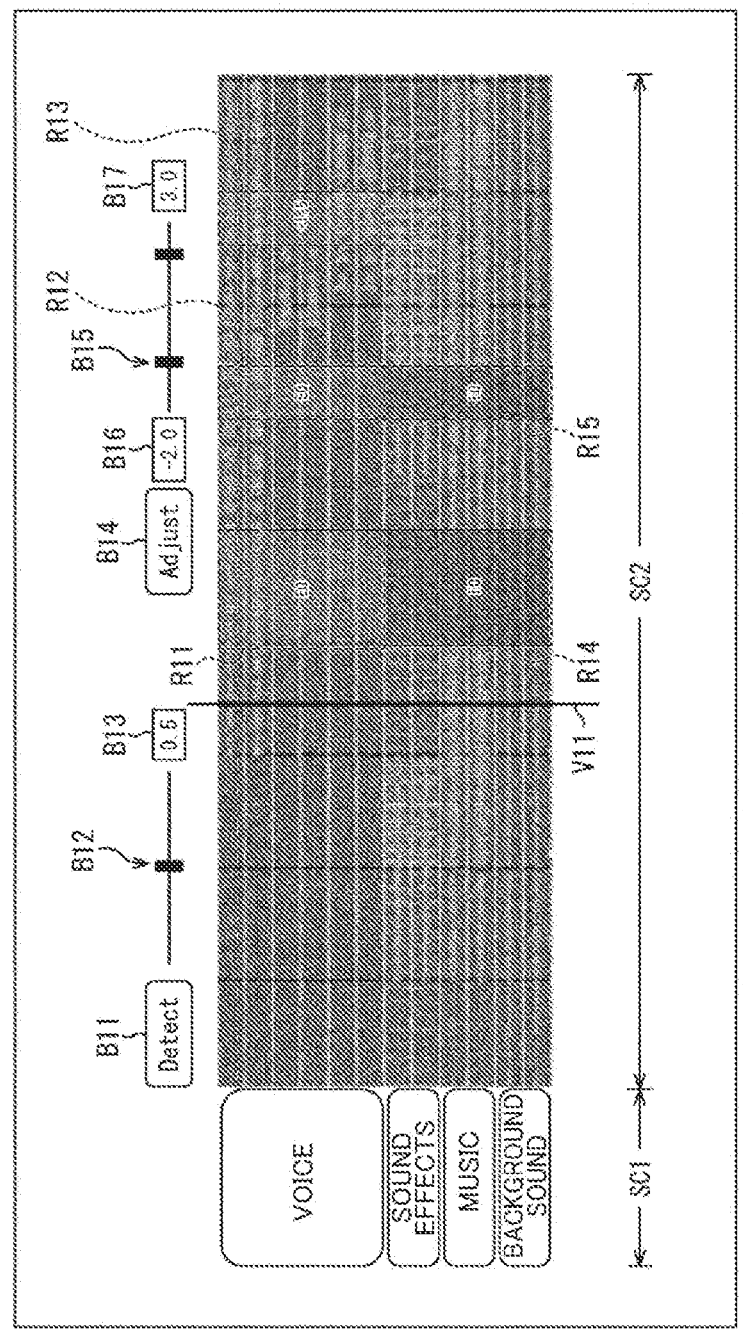
FIG. 5 is a diagram illustrating an example of an editing screen of the DAW to which the present technique is applied.

As a result, the result of the processing of the editing task E2(2) is reflected in the display in the editing screen, and the display in the editing screen is updated as indicated in FIG. 5, for example.

In this example, the region of the time segment for the track (the sound source) on which equalizer processing has been performed through the processing of the editing task E2(2) is displayed in a different color than in other regions.

Specifically, the region R11 and the region R12 in the part of the region SC2 for the sound source type of "voice" are displayed in a color different from the other regions, such as yellow. Note that the display of the region R13 is the same as in FIG. 4, and it can be seen that the processing of the editing task E2(2) has not been performed on the time segment corresponding to the region R13.

Similarly, a region R14 and a region R15 in the part of the region SC2 having sound source types aside from a sound source type of "voice" are displayed in a color different from the other regions, such as purple.

The character string "EQ", indicating that the equalizer processing has been performed on the time segments corresponding to the regions, is also displayed within the region R11, the region R12, the region R14, and the region R15. Performing such a display makes it possible for the user to instantly grasp on which time segment of which track the equalizer processing has been performed.

If there is a time segment ifrm for which the difference label$_{diff}$(ifrm) is greater than the threshold thre even after such processing of the editing task E2(2) is performed, the processing of the editing task E2(3) is then performed automatically.

In other words, replacement processing for replacing a part, of one or more tracks (audio signals) having a sound source type aside from "voice", corresponding to the time segment ifrm where the difference label$_{diff}$(ifrm) is higher than the threshold thre, with a signal of another sound source type, is performed.

Note that the replacement processing may be performed on all the tracks having a sound source type aside from "voice", or one track at a time may be selected and subjected to the replacement processing until the difference label$_{diff}$(ifrm) drops below the threshold thre.

At this time, the order in which the tracks on which the replacement processing is performed are selected may be determined based on the sound source type, the sound pressure value of the audio signal in the time segment ifrm where the difference label$_{diff}$(ifrm) is greater than the threshold thre, or the like.

Meanwhile, instead of replacing the signal in some time segments, the entire audio signal of the track may be replaced with the audio signal of another sound source.

Figure 6:
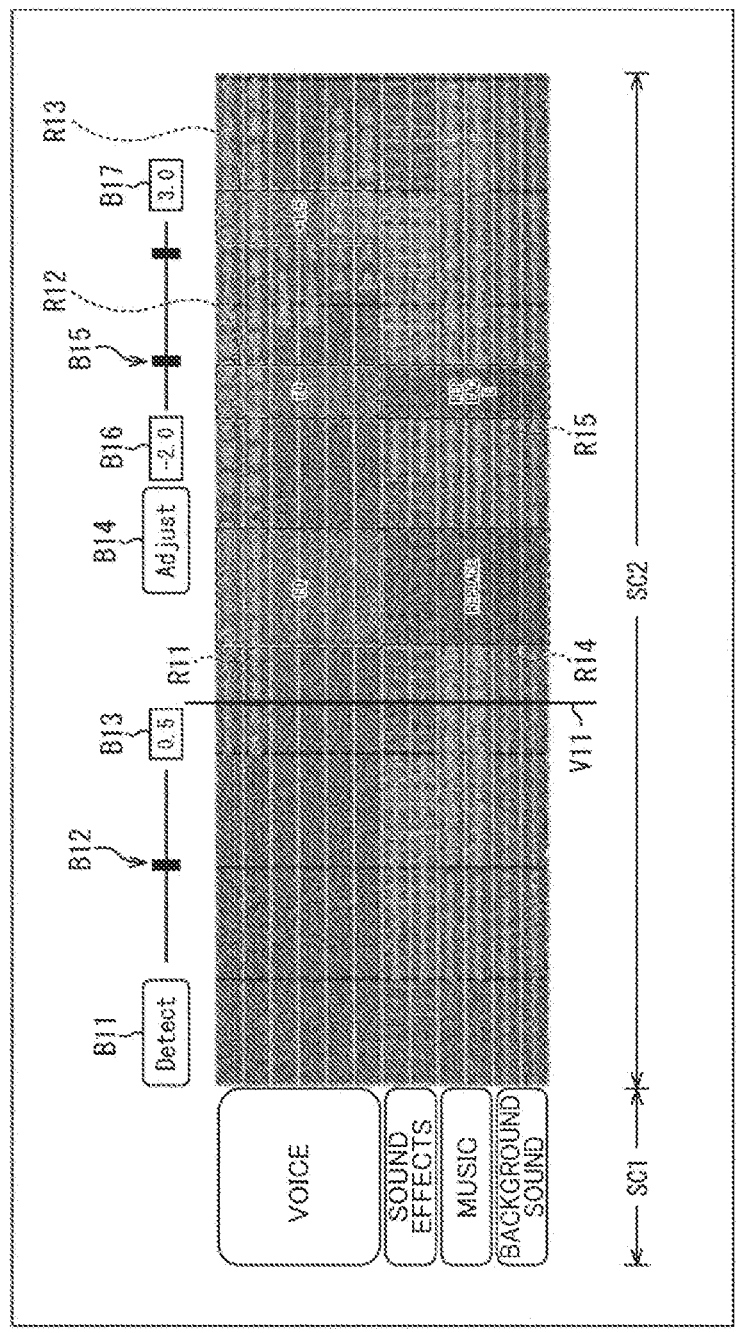
FIG. 6 is a diagram illustrating an example of an editing screen of the DAW to which the present technique is applied.

When the processing of the editing task E2(3), i.e., the replacement processing, is further performed from the state illustrated in FIG. 5, the result of the processing of the editing task E2(3) is reflected in the display, and the display of the editing screen is updated to that illustrated in FIG. 6, for example.

In this example, the region R11 to the region R13 in the time segment of the track (the sound source) on which the processing of the editing task E2(1), the editing task E2(2), and the like was performed, for the part of the region SC2 having a sound source type of "voice", are displayed in a different color from the other regions, such as yellow.

Additionally, the region R14 and the region R15 in the time segment of the track (the sound source) replaced through the processing of the editing task E2(3), for the part of the region SC2 having a sound source type aside from "voice", are displayed in a different color from the other regions, such as purple.

The character string "REPLACE", indicating that the replacement processing has been performed on the time segments corresponding to the regions, is also displayed within the region R14 and the region R15. Performing such a display makes it possible for the user to instantly grasp on which time segment of which track the replacement processing has been performed.

By providing the GUI described with reference to FIGS. 2 to 6 above in the DAW, the user can not only apply the present technique to the content being edited as necessary, but can also perform further editing tasks through the DAW after the technique has been applied, which streamlines the editing tasks. The content production cost can therefore be kept low.

Example of Configuration of Signal Processing Device

Figure 7:
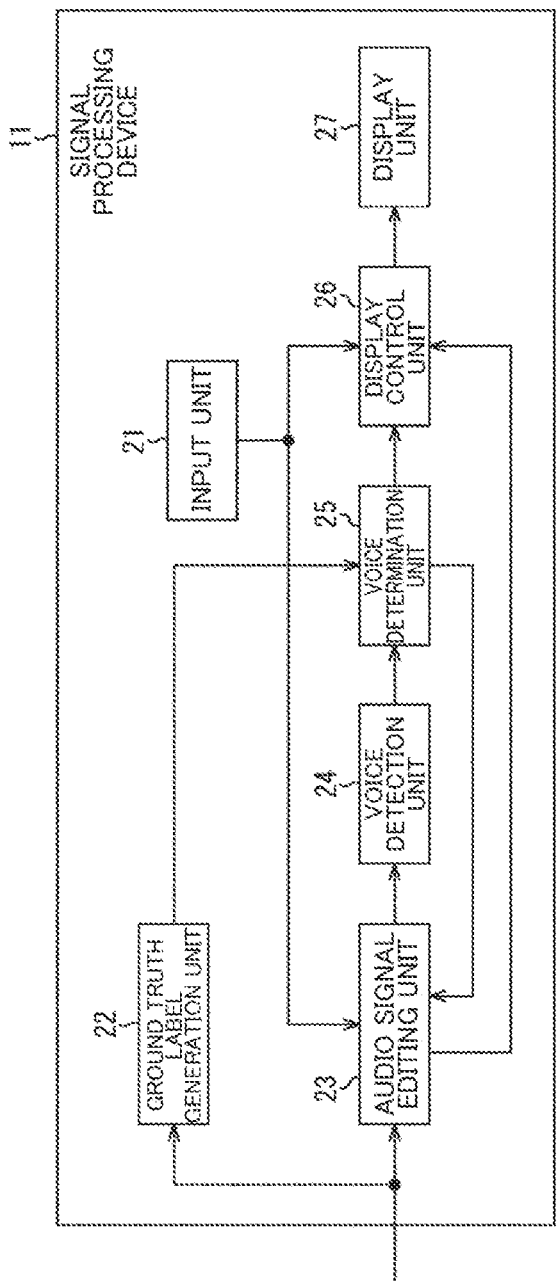
FIG. 7 is a diagram illustrating an example of the configuration of a signal processing device.

FIG. 7 is a diagram illustrating an example of the configuration of one embodiment of a signal processing device to which the present technique described above is applied.

A signal processing device 11 illustrated in FIG. 7 is constituted by a personal computer, a tablet terminal device, or the like, for example, and implements a DAW or the like by executing a program.

The signal processing device 11 includes an input unit 21, a ground truth label generation unit 22, an audio signal editing unit 23, a voice detection unit 24, a voice determination unit 25, a display control unit 26, and a display unit 27.

The input unit 21 is constituted by a mouse, a keyboard, a touch panel, or the like, for example, and supplies signals based on user operations to the audio signal editing unit 23, the display control unit 26, and the like.

The ground truth label generation unit 22 generates the voice audio added signal by adding audio signals having a sound source type of "voice" among the audio signals of sound sources constituting content which has been supplied, and adds a voice ground truth label to the voice audio added signal. In other words, a voice ground truth label for each time segment is generated based on the voice audio added signal.

The voice ground truth label is label information indicating whether the time segment in the voice audio added signal is a sound segment for a sound having a sound source type of "voice", and takes a value of "0" or "1".

The ground truth label generation unit 22 supplies the voice ground truth label for each time segment of the voice audio added signal to the voice determination unit 25.

Note that rather than providing the signal processing device 11 with the ground truth label generation unit 22, it is also possible for the voice ground truth label for each time segment, generated manually by a user or the like, to be supplied to the voice determination unit 25.

The audio signal editing unit 23 performs editing processing as appropriate on the audio signal of each sound source constituting the supplied content, and supplies the audio signal of each sound source obtained as a result to the voice detection unit 24 and the display control unit 26.

For example, the audio signal editing unit 23 performs the processing of the above-described editing task E2 as the editing processing, and supplies editing information pertaining to that editing to the display control unit 26.

Here, the editing information is information indicating the details of the editing on the audio signal, the location which was edited, and the like. In other words, the editing information includes information indicating, for example, the audio signal subject to the editing, the time segment of the audio signal which was edited, and the details of the editing processing performed on that time segment. In particular, the information indicating the details of the editing processing includes not only the type of the editing processing, such as gain adjustment, equalizer processing, replacement processing, and the like, but also information indicating the amount of volume adjustment, the post-replacement sound source, and so on from the editing processing.

The voice detection unit 24 holds a voice detector generated in advance through machine learning, and based on the voice detector, adds voice detection labels to the audio signals of the sound sources constituting the content supplied from the audio signal editing unit 23. In other words, a voice detection label is generated for each time segment of the content.

As described above, the voice detector is constituted by a neural network or the like generated through machine learning based on a training data set, for example.

The data set for training the voice detector is constituted by the following, obtained for a plurality of pieces of content: an audio signal in which an audio signal that is "voice", which is the target sound source, and an audio signal of a non-target sound source, i.e., a sound source aside from "voice", are mixed (the audio added signal); and the voice ground truth label added to the audio signal of the target sound source (the voice audio added signal).

This voice detector takes the audio signal in which sound of the target sound source and sound of the non-target sound source are mixed as an input, detects a time segment of the sound of the target sound source in the input audio signal, and outputs a result of the detection as the voice detection label. As described above, the voice detection label is a numerical value between "0" and "1". The voice detection unit 24 supplies the voice detection label, which is the output of the voice detector, to the voice determination unit 25.

Based on the voice ground truth label supplied from the ground truth label generation unit 22 and the voice detection label supplied from the voice detection unit 24, the voice determination unit 25 performs determination processing for determining whether the sound having a sound source type of "voice", which is the target, is easy to hear, for each time segment, and supplies a result of the determination to the audio signal editing unit 23, the display control unit 26, and the like.

The display control unit 26 controls the display unit 27 based on the signals input from the input unit 21, the determination result from the voice determination unit 25, and the audio signal and editing information from the audio signal editing unit 23, and causes a content editing screen of the DAW or the like to be displayed in the display unit 27.

This editing screen is a screen for editing the audio signal of each sound source in the content described with reference to FIGS. 2 to 6, for example, and the display control unit 26 controls the display unit 27 to display GUI components, such as the detect button B11 to the text box B17, in the editing screen.

The display unit 27 is a display device, and displays images of the editing screen and the like under the control of the display control unit 26.

Automatic Editing Processing

Operations of the signal processing device 11 will be described next.

It is assumed, for example, that the audio signal of each sound source (track) in the content to be edited by the signal processing device 11 is loaded, and the editing screen illustrated in FIG. 2 is displayed in the display unit 27.

At this time, for example, the user operates the input unit 21 to manipulate the detection threshold bar B12, the text box B13, and the like as appropriate to specify the threshold thre, and when the user further manipulates the detect button B11, the signal processing device 11 starts the automatic editing processing.

Figure 8:
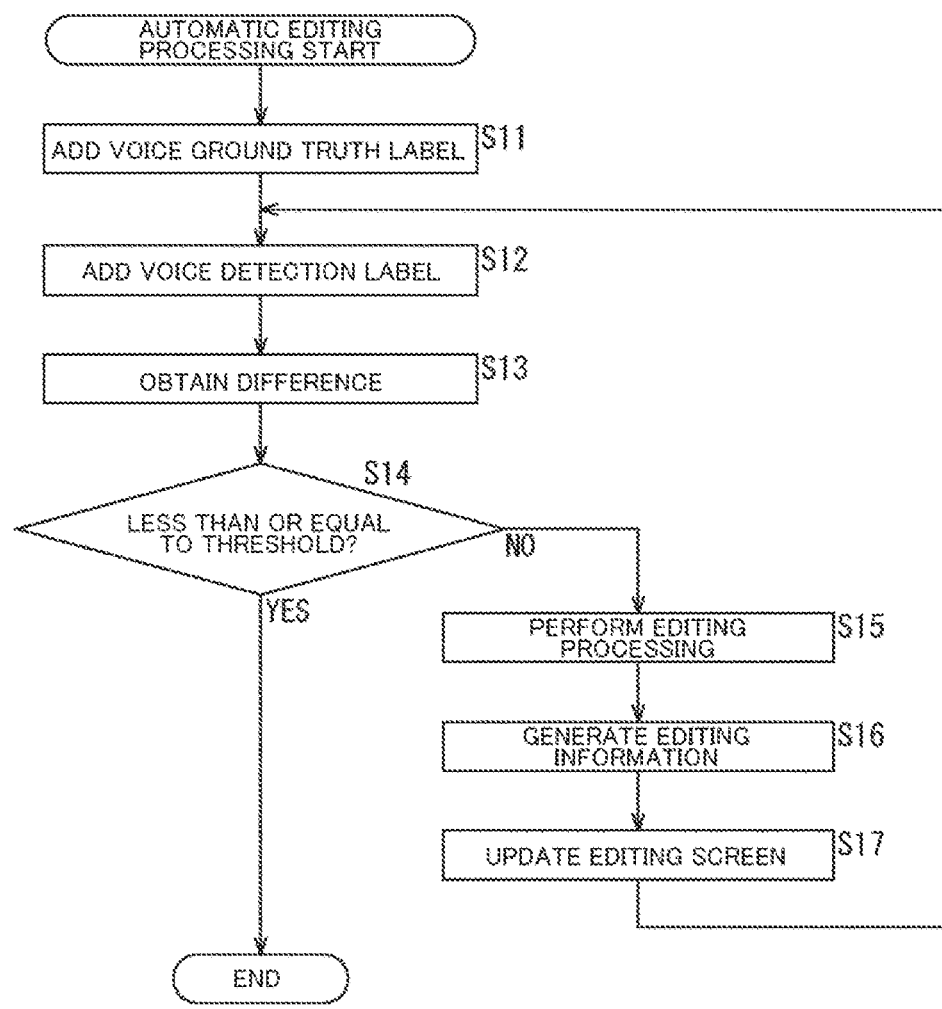
FIG. 8 is a flowchart illustrating automatic editing processing.

The automatic editing processing by the signal processing device 11 will be described hereinafter with reference to the flowchart in FIG. 8.

In step S11, the ground truth label generation unit 22 adds voice ground truth labels to the audio signals in the supplied content.

In other words, for example, the ground truth label generation unit 22 generates the voice audio added signal by adding audio signals having a sound source type of "voice" among the audio signals of sound sources constituting the content which has been supplied.

Additionally, for example, by performing threshold determination processing on sound pressure values of the voice audio added signal, computation processing based on the voice audio added signal and parameters constituting a discriminator such as a neural network trained in advance, and so on, the ground truth label generation unit 22 detects whether sound having a sound source type of "voice" is present in each time segment of the voice audio added signal.

The ground truth label generation unit 22 supplies, to the voice determination unit 25, the voice ground truth label of each time segment obtained as a result of detecting whether sound having a sound source type of "voice" is present.

Additionally, the audio signal editing unit 23 supplies the audio signal of each sound source constituting the supplied content to the voice detection unit 24 as-is.

In step S12, the voice detection unit 24 adds voice detection labels to the audio signals of the content based on the voice detector held in advance and the audio signal of each sound source constituting the content supplied from the audio signal editing unit 23.

For example, by generating an audio added signal by adding the audio signals of all sound sources (tracks) constituting the supplied content, and then performing computation processing based on that audio added signal and the parameters constituting the voice detector, the voice detection unit 24 obtains a voice detection label for each time segment.

The voice detection unit 24 supplies the voice detection label for each time segment obtained in this manner to the voice determination unit 25.

In step S13, the voice determination unit 25 obtains the difference label$_{diff}$(ifrm) for each time segment by performing the calculation of the above-described Formula (1) based on the voice ground truth labels supplied from the ground truth label generation unit 22 and the voice detection labels supplied from the voice detection unit 24.

In step S14, the voice determination unit 25 compares the threshold thre determined in accordance with the signal supplied from the input unit 21 and the like with the difference label$_{diff}$(ifrm) obtained in step S13, and determines whether the difference label$_{diff}$(ifrm) is less than or equal to the threshold thre. In other words, determination processing as to whether the voice (the sound having a sound source type of "voice") is easy to hear in the audio added signal is performed by performing threshold processing on the difference label$_{diff}$(ifrm).

Here, if the difference label$_{diff}$(ifrm) is greater than the threshold thre in any one time segment among all the time segments, the difference label$_{diff}$(ifrm) is determined not to be less than or equal to the threshold thre.

The voice determination unit 25 supplies the result of the determination as to whether the difference label$_{diff}$(ifrm) is less than or equal to the threshold thre to the audio signal editing unit 23 and the display control unit 26.

In step S14, if the difference label$_{diff}$(ifrm) is determined not to be less than or equal to the threshold thre, i.e., it is determined that there is a time segment in which the voice is difficult to hear, the processing moves to step S15.

In this case, for example, immediately after the user has operated the detect button B11, i.e., in a state where the processing of the editing task E2 has not yet been performed, the display control unit 26 controls the display unit 27 based on the determination result supplied from the voice determination unit 25, and updates the display of the editing screen.

By controlling the display according to the determination result in this manner, for example, the time segment for which voice is determined to be difficult to hear is displayed in the editing screen in a different display format from the other time segments. In other words, a display indicating the time segment for which voice is determined to be difficult to hear is performed.

Specifically, for example, the display of the editing screen indicated in FIG. 2 is updated, and the editing screen illustrated in FIG. 3 is displayed in the display unit 27.

In this state, the user operates the input unit 21 as appropriate to manipulate the adjustment threshold bar B15, the text box B16, and the text box B17, and specifies the upper limit value and the lower limit value for the volume adjustment range (the adjustment threshold). Upon doing so, signals based on the user's operations are supplied from the input unit 21 to the audio signal editing unit 23, the display control unit 26, and the like.

Furthermore, when the user operates the input unit 21 to manipulate the adjust button B14 and instruct the processing of the editing task E2 to be executed, a signal based on that operation is supplied from the input unit 21 to the audio signal editing unit 23, after which the processing of step S15 is performed.

In step S15, the audio signal editing unit 23 performs the processing of the above-described editing task E2 as the editing processing on the audio signal of a predetermined sound source constituting the content.

In particular, in step S15, the time segment for which the difference $label_{diff}(ifrm)$ is greater than the threshold thre is taken as the target, and the editing processing is performed on that time segment.

In this case, editing processing for making sound having a sound source type of "voice" easier to hear is performed on at least one of the audio signal having a sound source type of "voice" and the audio signal having a sound source type aside from "voice".

For example, immediately after the adjust button B14 is operated, the processing of the editing task E2(1), i.e., the gain adjustment on the audio signal of each sound source, is performed as the processing of the editing task E2. At this time, the audio signal editing unit 23 adjusts the gain within the volume adjustment range determined according to the signals supplied from the input unit 21, i.e., specified by the user.

Additionally, if the difference $label_{diff}(ifrm)$ is not less than or equal to the threshold thre in step S14 even after performing the processing of the editing task E2(1) within the volume adjustment range, the audio signal editing unit 23 performs the processing of the editing task E2(2), i.e., the equalizer processing on the audio signal of each sound source, as the editing task E2. In this case, the processing of the editing task E2(2) is performed on the time segment for which the difference $label_{diff}(ifrm)$ is greater than the threshold thre.

Furthermore, if the difference $label_{diff}(ifrm)$ is not less than or equal to the threshold thre in step S14 even after performing the processing of the editing task E2(2) within the volume adjustment range, the audio signal editing unit 23 performs the processing of the editing task E2(3), i.e., the replacement processing on the audio signal of each sound source, as the editing task E2. In this case too, the processing of the editing task E2(3) is performed on the time segment for which the difference $label_{diff}(ifrm)$ is greater than the threshold thre.

Note that in step S15, the processing of at least one of the editing task E2(1) to the editing task E2(3) may be performed as the editing processing.

In step S16, the audio signal editing unit 23 generates the editing information pertaining to the editing processing which has been performed (the processing of the editing task E2) based on the processing result of the editing task E2.

When the editing information is generated, the audio signal editing unit 23 supplies that editing information along with the audio signal of each sound source in the edited content to the display control unit 26, and supplies the audio signal of each sound source in the edited content to the voice detection unit 24.

In step S17, the display control unit 26 controls the display unit 27 based on the signals from the input unit 21, the editing information and audio signal from the audio signal editing unit 23, and the like, and updates the editing screen displayed in the display unit 27.

For example, when the processing of the editing task E2(1) is performed in a state where the editing screen illustrated in FIG. 3 is displayed, the display control unit 26 updates the editing screen to display the editing screen illustrated in FIG. 4.

Then, when, for example, the processing of the editing task E2(2) is performed, the necessary display updates are performed as appropriate, such as displaying the editing screen illustrated in FIG. 5.

As a result, as illustrated in FIGS. 4 and 5, for example, the time segments in which the editing processing was performed, such as the region R11 to the region R15, are displayed in a different display format from the other time segments.

Additionally, in the regions of the time segments where the editing processing was performed, such as the region R11 to the region R15, information indicating the details of the editing processing performed, such as "EQ", information indicating the amount of the adjustment made during the editing processing, such as "+3.0", and the like are displayed.

In FIGS. 4 to 6, only one of the information indicating the details of the editing processing and the information indicating the amount of the adjustment made during the editing processing is displayed in the regions of the time segments where the editing processing was performed, but both may be displayed instead.

When the processing of step S17 has been performed, the processing then returns to step S12 and the above-described processing is repeated.

In this case, for example, the processing of step S12 to S14 is performed based on the edited audio signal of each sound source, and the editing processing is repeated until the difference $label_{diff}(ifrm)$ is determined to be less than or equal to the threshold thre, i.e., until the voice is determined to be easy to hear.

When it is determined in step S14 that the difference $label_{diff}(ifrm)$ is less than or equal to the threshold thre, an audio signal for each sound source in the content, in which the voice is easy to hear, has been obtained, and thus the automatic editing processing ends.

At this time, the audio signal editing unit 23 outputs the audio signal of each sound source in the content obtained through the editing, supplies the stated audio signal to a recording unit (not shown) for recording, or the like as appropriate. Additionally, the display control unit 26 updates the display of the editing screen as necessary by displaying the editing screen illustrated in FIG. 6, for example. At this time, a message indicating that the processing of the editing task E2 has ended and the voice has become easier to hear may be displayed in the editing screen.

As described thus far, the signal processing device 11 determines whether voice in content is easy to hear, and performs editing processing for making the voice easier to hear according to a result of the determination. Doing so makes it possible to improve the work efficiency during editing and reduce content production costs.

Example of Configuration of Computer

The above-described series of processing can also be executed by hardware or software. In the case where the series of processes is executed by software, a program that configures the software is installed on a computer. Here, the computer includes, for example, a computer built in dedicated hardware, a general-purpose personal computer on which various programs are installed to be able to execute various functions, and the like.

Figure 9:
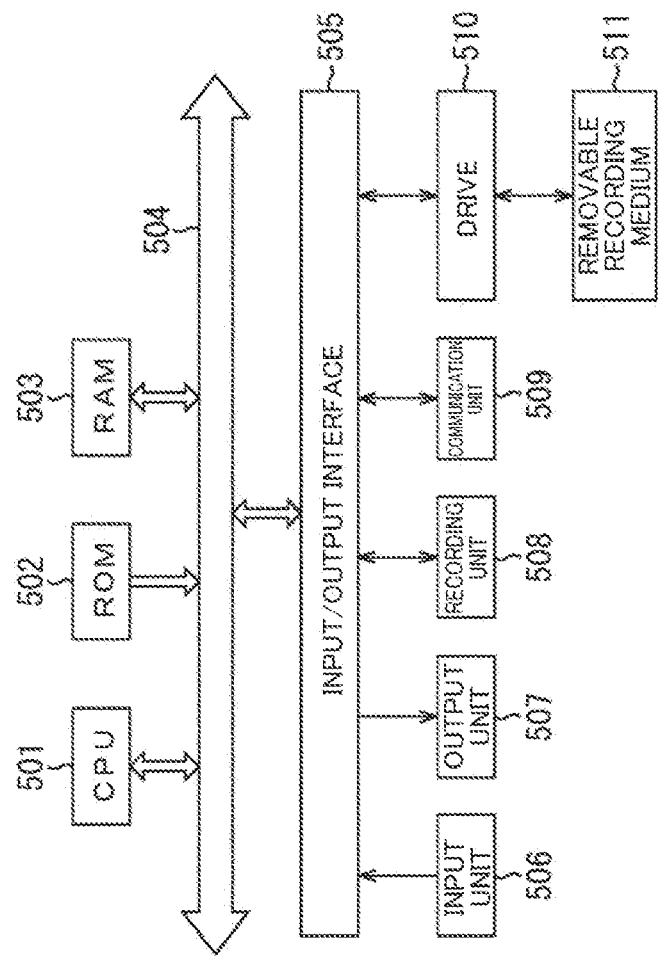
FIG. 9 is a diagram illustrating an example of the configuration of a computer.

FIG. 9 is a block diagram illustrating a configuration example of computer hardware that executes the above-described series of processing using a program.

In the computer, a central processing unit (CPU) 501, read-only memory (ROM) 502, and random access memory (RAM) 503 are connected to each other by a bus 504.

An input/output interface 505 is further connected to the bus 504. An input unit 506, an output unit 507, a recording unit 508, a communication unit 509, and a drive 510 are connected to the input/output interface 505.

The input unit 506 is a keyboard, a mouse, a microphone, an image sensor, or the like. The output unit 507 is a display, a speaker, or the like. The recording unit 508 is constituted by a hard disk, non-volatile memory, or the like. The communication unit 509 is a network interface or the like. The drive 510 drives a removable recording medium 511 such as a magnetic disk, an optical disc, a magneto-optical disk, or a semiconductor memory.

In the computer configured as described above, for example, the above-described series of processing is performed by the CPU 501 loading a program recorded in the recording unit 508 into the RAM 503 through the input/output interface 505 and the bus 504 and executing the program.

The program executed by the computer (the CPU 501) can be recorded on, for example, the removable recording medium 511, as a packaged medium, and provided in such a state. The program can also be provided over a wired or wireless transmission medium such as a local area network, the Internet, or digital satellite broadcasting.

In the computer, by mounting the removable recording medium 511 on the drive 510, the program can be installed in the recording unit 508 through the input/output interface 505. Furthermore, the program can be received by the communication unit 509 over a wired or wireless transfer medium and installed in the recording unit 508. In addition, this program may be installed in advance in the ROM 502 or the recording unit 508.

Note that the program executed by the computer may be a program in which the processing is performed chronologically in the order described in the present specification, or may be a program in which the processing is performed in parallel or at a necessary timing such as when called.

Additionally, the embodiments of the present technique are not limited to the above-described embodiments, and various modifications can be made without departing from the essential spirit of the present technique.

For example, the present technique may be configured through cloud computing in which a plurality of devices share and cooperatively process one function over a network.

In addition, each step described with reference to the foregoing flowcharts can be executed by a single device, or in a distributed manner by a plurality of devices.

Furthermore, when a single step includes a plurality of processes, the plurality of processes included in the single step can be executed by a single device, or in a distributed manner by a plurality of devices.

Furthermore, the present technique can also be configured as follows.

(1) A signal processing device including:
  a voice detection unit that, based on a mixed audio signal containing a sound of a target sound source and a sound of a non-target sound source different from the target sound source, detects a time segment of the sound of the target sound source from the mixed audio signal; and
  a voice determination unit that, based on (i) label information indicating the time segment of the sound of the target sound source in an audio signal of the target sound source and (ii) a detection result for the time segment of the sound of the target sound source, performs determination processing for determining whether the sound of the target sound source in the mixed audio signal is easy to hear.

(2) The signal processing device according to (1),
  wherein the voice determination unit performs the determination processing by performing, for each time segment, threshold processing with respect to a value based on the label information and the detection result.

(3) The signal processing device according to (1) or (2), further including:
  an editing unit that, when the sound of the target sound source is determined to be difficult to hear through the determination processing, performs editing processing for making the sound of the target sound source easier to hear on at least one of the audio signal of the target sound source and the audio signal of the non-target sound source.

(4) The signal processing device according to (3),
  wherein the voice detection unit detects the time segment of the sound of the target sound source based on an edited mixed audio signal generated using an audio signal obtained from the editing processing, the edited mixed audio signal containing the sound of the target sound source and the sound of the non-target sound source,
  the voice determination unit performs the determination processing based on (i) a detection result for the time segment of the sound of the target sound source based on the edited mixed audio signal and (ii) the label information, and the editing unit repeatedly performs the editing processing until the sound of the target sound source is determined to be easy to hear in the determination processing.

(5) The signal processing device according to (3) or (4),
  wherein as the editing processing, the editing unit performs at least one of gain adjustment, equalizer processing, or replacement processing for replacing the audio signal of the non-target sound source with another audio signal.

(6) The signal processing device according to any one of (3) to (5), further including:
a display control unit that, based on a result of the determination processing, controls a display in an editing screen for editing the audio signal of the target sound source and the audio signal of the non-target sound source.

(7) The signal processing device according to (6), wherein the display control unit causes a time segment for which the sound of the target sound source is determined to be difficult to hear by the determination processing to be displayed in a different display format from other time segments in the editing screen.

(8) The signal processing device according to (6) or (7), wherein the display control unit causes a GUI component for specifying a parameter used in the editing processing to be displayed in the editing screen.

(9) The signal processing device according to any one of (6) to (8), wherein the display control unit causes a GUI component for instructing the determination processing to be performed to be displayed in the editing screen.

(10) The signal processing device according to any one of (6) to (9), wherein the display control unit causes a GUI component for instructing the editing processing to be performed to be displayed in the editing screen.

(11) The signal processing device according to any one of (6) to (10), wherein in a case where the editing processing has been performed, the display control unit causes a time segment in the editing screen on which the editing processing has been performed to be displayed in a different display format from other time segments.

(12) The signal processing device according to (11), wherein in a case where the editing processing has been performed, the display control unit causes at least one of information indicating the editing processing performed or information indicating an amount of adjustment performed in the editing processing to be displayed in the time segment in the editing screen on which the editing processing has been performed.

(13) The signal processing device according to any one of (1) to (12), wherein the voice detection unit detects the time segment of the sound of the target sound source based on a voice detector that takes the mixed audio signal as an input and outputs a detection result for the time segment of the sound of the target sound source.

(14) The signal processing device according to (13), wherein the voice detector is generated in advance through machine learning.

(15) The signal processing device according to (14), wherein the voice detector is constituted by a neural network.

(16) The signal processing device according to any one of (1) to (15), wherein the voice detection unit generates the mixed audio signal by adding the audio signal of the target sound source and the audio signal of the non-target sound source.

(17) The signal processing device according to any one of (1) to (16), further including:

a label information generation unit that generates the label information based on the audio signal of the target sound source.

(18) A signal processing method performed by a signal processing device, the signal processing method including:
detecting, based on a mixed audio signal containing a sound of a target sound source and a sound of a non-target sound source different from the target sound source, a time segment of the sound of the target sound source from the mixed audio signal; and
based on (i) label information indicating the time segment of the sound of the target sound source in an audio signal of the target sound source and (ii) a detection result for the time segment of the sound of the target sound source, performing determination processing for determining whether the sound of the target sound source in the mixed audio signal is easy to hear.

(19) A program that causes a computer to perform processing including the steps of
detecting, based on a mixed audio signal containing a sound of a target sound source and a sound of a non-target sound source different from the target sound source, a time segment of the sound of the target sound source from the mixed audio signal; and
based on (i) label information indicating the time segment of the sound of the target sound source in an audio signal of the target sound source and (ii) a detection result for the time segment of the sound of the target sound source, performing determination processing for determining whether the sound of the target sound source in the mixed audio signal is easy to hear.

REFERENCE SIGNS LIST

11 Signal processing device
21 Input unit
22 Ground truth label generation unit
23 Audio signal editing unit
24 Voice detection unit
25 Voice determination unit
26 Display control unit
27 Display unit

The invention claimed is:
1. A signal processing device, comprising:
a central processing unit (CPU) configured to:
acquire a plurality of voice audio added signals;
train a machine learning model based on the plurality of voice audio added signals;
acquire a mixed audio signal that includes a sound of a target sound source and a sound of a plurality of non-target sound sources, wherein the plurality of non-target sound sources is different from the target sound source;
determine label information based on the trained machine learning model;
add the label information to each of a plurality of time segments of the mixed audio signal;
detect a specific time segment of the plurality of time segments, wherein the specific time segment is associated with the sound of the target sound source;
perform a determination process for the specific time segment based on the label information and the specific time segment, wherein the label information indicates the specific time segment in a first audio signal of the target sound source;
determine a confirmation signal based on the performed determination process, wherein the confirmation sig- nal is associated with ease of hearing of the sound of the target sound source; and control an editing screen to display the confirmation signal.

2. The signal processing device according to claim 1, wherein the CPU is further configured to perform the determination process for each of the plurality of time segments, the determination process includes a threshold process with respect to a threshold value, and the threshold process is based on the label information and the specific time segment.

3. The signal processing device according to claim 1, wherein the CPU is further configured to:

determine the sound of the target sound source is less than a threshold value; and based on the sound of the target sound source is less than the threshold value, perform an editing process on at least one of the first audio signal of the target sound source or a second audio signal of the plurality of non-target sound sources.

4. The signal processing device according to claim 3, wherein the CPU is further configured to:

determine a third audio signal based on the editing process;

generate an edited mixed audio signal based the third audio signal;

detect the specific time segment based on the edited mixed audio signal, wherein the edited mixed audio signal includes the sound of the target sound source and the sound of the plurality of non-target sound sources;

perform the determination process based on the specific time segment and the label information; and perform the editing process based on the determination of the confirmation signal.

5. The signal processing device according to claim 3, wherein the editing process-includes at least one of gain adjustment, an equalizer process-processing, or a replacement process, and the replacement process corresponds to replacement of the second audio signal of the plurality of non-target sound sources with a third audio signal different from the second audio signal of the plurality of non-target sound sources.

6. The signal processing device according to claim 3, wherein the CPU is further configured to control the editing screen to edit the first audio signal of the target sound source and the second audio signal of the plurality of non-target sound sources.

7. The signal processing device according to claim 6, wherein the CPU is further configured to:

determine, in the specific time segment, the sound of the target sound source is less than the threshold value; and based on the sound of the target sound source is less than the threshold value, control the editing screen to display the specific time segment in display format different from a display format of the plurality of time segments.

8. The signal processing device according to claim 6, wherein the CPU is further configured to control the editing screen to display a graphical user interface (GUI) component, and the GUI component specifies a parameter associated with the editing process.

9. The signal processing device according to claim 6, wherein the CPU is further configured to control the editing screen to display a GUI component, and the GUI component controls the determination process.

10. The signal processing device according to claim 6, wherein the CPU is further configured to control the editing screen to display a GUI component, and the GUI component controls the editing process.

11. The signal processing device according to claim 6, wherein based on the editing process, the CPU is further configured to control the editing screen to display the specific time segment in a display format different from a display format of the plurality of time segments.

12. The signal processing device according to claim 11, wherein based on the editing process, the CPU is further configured to control the editing screen to display, in the specific time segment, at least one of first information or second information, the first information is associated with the editing process, and the second information indicates an amount of adjustment in the editing process.

13. The signal processing device according to claim 1, wherein the CPU is further configured to:

detect the specific time segment based on the mixed audio signal as an input; and output a detection result of the specific time segment.

14. The signal processing device according to claim 1, wherein the CPU is further configured to:

add the first audio signal of the target sound source and a second audio signal of the plurality of non-target sound sources; and generate the mixed audio signal based on the addition of the first audio signal of the target sound source and the second audio signal of the plurality of non-target sound sources.

15. The signal processing device according to claim 1, wherein the CPU is further configured to generate the label information based on the first audio signal of the target sound source.

16. A signal processing method comprising:

in a signal processing device:

acquiring a plurality of voice added audio signals;

training a machine learning model based on the plurality of voice audio added signals;

acquiring a mixed audio signal that includes a sound of a target sound source and a sound of a plurality of non-target sound sources, wherein the plurality of non-target sound sources is different from the target sound source;

determining label information based on the trained machine learning model:

adding the label information to each of a plurality of time segments of the mixed audio signal;

detecting a specific time segment of the plurality of time segments, wherein the specific time segment is associated with the sound of the target sound source;

performing a determination process for the specific time segment based on the label information and the specific time segment , wherein the label information indicates the specific time segment in an audio signal of the target sound source;

determining a confirmation signal based on the performed determination process, wherein the confirmation signal is associated with ease of hearing of the sound of the target sound source; and controlling an editing screen to display the confirmation signal.

17. A non-transitory computer-readable medium having stored thereon, computer-executable instructions which, when executed by a computer, cause the computer to execute operations, the operations comprising:

acquiring a plurality of voice added audio signals;

training a machine learning model based on the plurality of voice audio added signals:

acquiring a mixed audio signal that includes a sound of a target sound source and a sound of a plurality of non-target sound sources. wherein the plurality of non-target sound sources is different from the target sound source;

determining label information based on the trained machine learning model;

adding the label information to each of a plurality of time segments of the mixed audio signal;

detecting a specific time segment of the plurality of time segments, wherein the specific time segment is associated with the sound of the target sound source;

performing a determination process for the specific time segment based on the label information and the specific time segment, wherein the label information indicates the specific time segment in an audio signal of the target sound source;

determining a confirmation signal based on the performed determination process, wherein the confirmation signal is associated with ease of hearing of the sound of the target sound source; and controlling an editing screen to display the confirmation signal.

\* \* \* \* \*